(12) United States Patent
Juneja

(10) Patent No.: US 10,523,547 B2
(45) Date of Patent: Dec. 31, 2019

(54) METHODS, SYSTEMS, AND COMPUTER READABLE MEDIA FOR MULTIPLE BIDIRECTIONAL FORWARDING DETECTION (BFD) SESSION OPTIMIZATION

(71) Applicant: Oracle International Corporation, Redwood Shores, CA (US)

(72) Inventor: Rohit Juneja, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 45 days.

(21) Appl. No.: 15/973,467

(22) Filed: May 7, 2018

(65) Prior Publication Data

US 2019/0342200 A1   Nov. 7, 2019

(51) Int. Cl.
*H04L 29/06* (2006.01)
*H04L 12/26* (2006.01)
*H04L 29/08* (2006.01)

(52) U.S. Cl.
CPC ............ *H04L 43/10* (2013.01); *H04L 67/147* (2013.01); *H04L 69/325* (2013.01)

(58) Field of Classification Search
CPC ................ H04L 12/4633; H04L 69/22; H04L 29/12311; H04L 61/2084; H04L 63/0281; H04L 63/0428; H04L 61/2038; H04L 63/0245; H04L 29/06027; H04L 29/12094; H04L 63/0236; H04L 63/029; H04W 8/26; H04W 76/12; H04W 12/02; H04W 72/04; H04W 12/06; H04W 12/08; H04W 12/0806; H04W 74/00
See application file for complete search history.

(56) References Cited

PUBLICATIONS

Pignataro et al., "Seamless Bidirectional Forwarding Detection (S-BFD)," Internet Engineering Task Force, RFC 7880, pp. 1-24 (Jul. 2016).
Akiya et al., "Common Interval Support in Bidirectional Forwarding Detection," Internet Engineering Task Force, RFC 7419, pp. 1-8 (Dec. 2014).
Katz et al., "Bidirectional Forwarding Detection (BDF)," Internet Engineering Task Force, RFC 5880, pp. 1-49 (Jun. 2010).

*Primary Examiner* — Sai Aung
(74) *Attorney, Agent, or Firm* — Jenkins, Wilson, Taylor & Hunt P.A.

(57) ABSTRACT

A method for multiple BFD session optimization includes receiving a request for establishing a BFD session and in response, establishing a first BFD session for monitoring a link to a remote node over a first network interface. The type of the first BFD session is set to normal. BFD control packets are exchanged with the remote node as part of the first session for monitoring status of link to the remote node. A request for establishing a second BFD session to monitor the status of the same link is received. In response, the type of the first BFD session is changed to master. A second BFD session is established, and the type of the second BFD session is set to slave. For the second BFD session, BFD session state is obtained from the first BFD session without exchanging BFD control packets for the second BFD session with the remote node.

20 Claims, 6 Drawing Sheets

METHODS, SYSTEMS, AND COMPUTER READABLE MEDIA FOR MULTIPLE BIDIRECTIONAL FORWARDING DETECTION (BFD) SESSION OPTIMIZATION

TECHNICAL FIELD

The subject matter described herein relates to optimizing multiple BFD sessions. More particularly, the subject matter described herein related to optimizing multiple BFD sessions that are directed to monitoring the same target over the same interface.

BACKGROUND

Bidirectional forwarding detection or BFD is described in Internet Engineering Task Force (IETF) Requests For Comments (RFCs) 5880 [1], 7880 [2], and 7419 [3]. BFD provides a mechanism for rapid detection of communication failures between adjacent systems in order to establish alternative paths. Networks typically use relatively slow "hello" type procedures implemented in routing protocols to detect failures and establish alternate paths. One problem with such protocols is that the latency in detecting a link or a path failure is high, and such protocols implemented within routing protocols are not useful if the routing protocols themselves are not in use.

BFD is designed to detect failures between adjacent systems quickly. BFD operates independently of media, data protocols, and routing protocols. Thus, BFD avoids some of the difficulties associated with "hello" protocols that have high latency or are implemented within routing protocols and only useful when the routing protocols are implemented by both endpoints.

One problem with BFD implementations is that if there are multiple applications that need to monitor a network interface or link for liveness, then one BFD session is created for each application, and each BFD session sends and receives BFD control packets to detect liveness of the same interface/link. Such duplicate messaging could flood the network with unnecessary BFD control packets. In addition, processing resources on the computing platforms hosting the BFD session endpoints are also unnecessarily wasted.

In one example use case, one application establishes and uses a first BFD session to monitor connectivity with a remote node. The application may be a router or any other suitable application that executes on a computing platform and needs to maintain status information regarding a link. The first BFD session sends BFD control packets over the link to the remote node to monitor connectivity with the remote node.

A second application creates a second BFD session to monitor the same link to the same remote node as the first BFD session. The second BFD session also results in BFD control packets being sent over the link being monitored. Even though both applications are monitoring the same link to the same remote node, duplicate BFD control packets are being sent over the link, and such an implementation is inefficient for the reasons set forth above.

Accordingly, in light of these difficulties, there exists a need for methods, systems, and computer readable media for optimizing multiple BFD session behavior when the BFD sessions are monitoring connectivity with the same remote node over the same network interface or link.

SUMMARY

Methods, systems, and computer readable media for multiple BFD session optimization are disclosed. One method includes receiving a request for establishing a BFD session and in response, establishing a first BFD session for monitoring a link to a remote node over a first network interface. The type of the first BFD session is set to normal. BFD control packets are exchanged with the remote node as part of the first session for monitoring status of link to the remote node. A request for establishing a second BFD session to monitor the status of the same link is received. In response, the type of the first BFD session is changed to master. A second BFD session is established, and the type of the second BFD session is set to slave. For the second BFD session, BFD session state is obtained from the first BFD session without exchanging BFD control packets for the second BFD session with the remote node.

A system for optimizing multiple BFD sessions includes a computing platform including at least one processor. The system further includes a BFD session manager implemented by the at least one processor for receiving a request for establishing a BFD session and, in response, establishing a first BFD session for monitoring connectivity with a remote node over a network interface, setting a type of the first BFD session to normal, receiving a request for establishing a second BFD session for monitoring connectivity with the remote node over the network interface and, in response, changing the type of the first BFD session to master, and creating a second BFD session and setting a type of the second BFD session to slave. The first BFD session exchanges BFD control packets with the remote node as part of the first BFD session for monitoring connectivity with the remote node. The second BFD session obtains BFD session state information from the first BFD session without exchanging BFD control packets for the second BFD session with the remote node.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Method, systems, and computer readable media for optimizing multiple BFD sessions that monitor the status of the same link to the same remote node are disclosed. Rather than establishing separate BFD sessions that each exchange BFD control packets with the same remote node, the subject matter described herein allows linking of BFD sessions where one BFD session acts as a master and exchanges BFD control packets with the remote node to maintain status information regarding a link to the remote node. Subsequent BFD sessions that monitor the status of the same link to the same remote node are linked to the first BFD session. The linked BFD sessions established after the first BFD session function as slaves and receive their session state information from the master BFD session without exchanging BFD control packets with the remote node.

Figure 1:
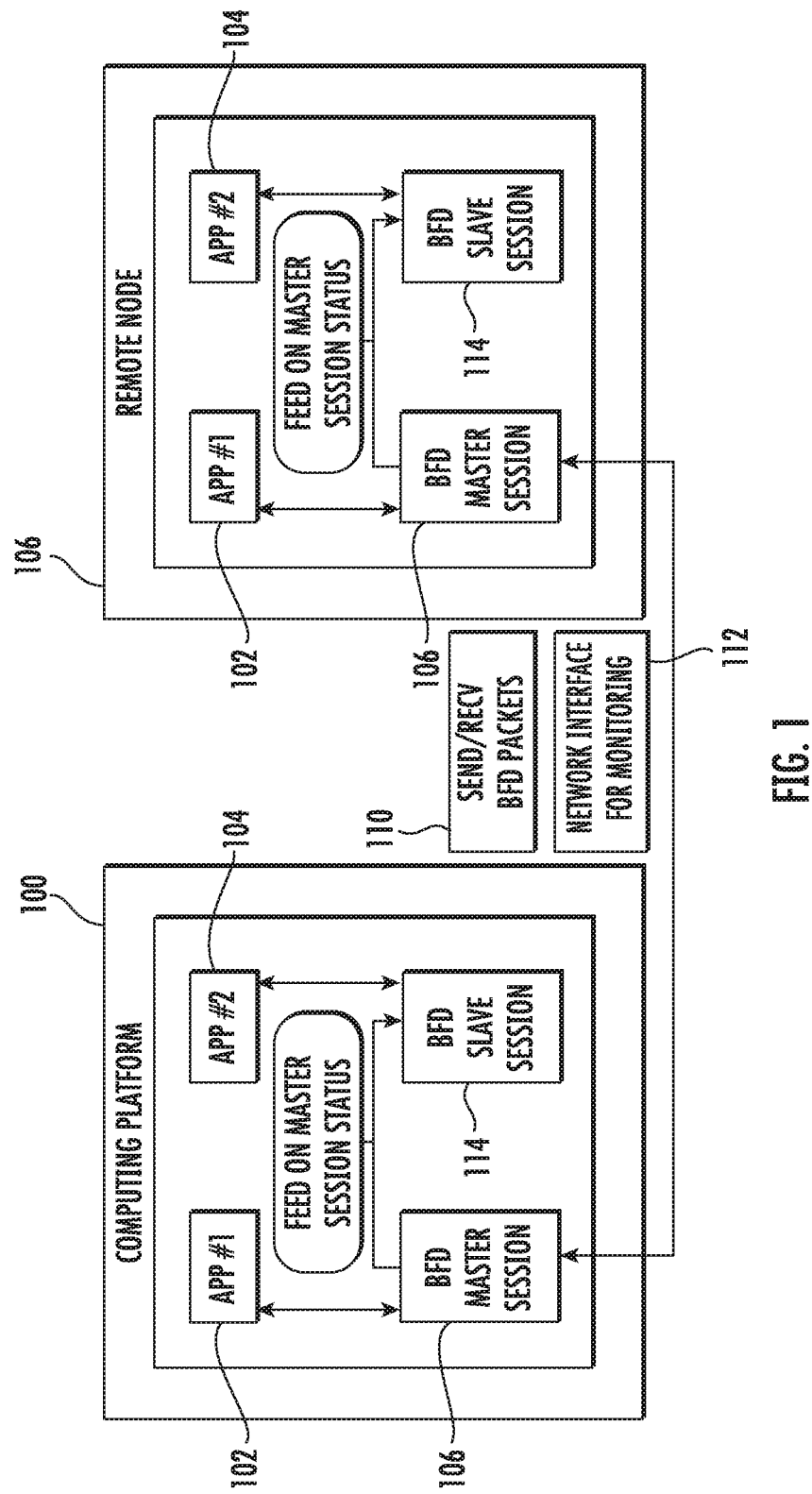
FIG. 1 is a network diagram illustrating multiple BFD session optimization between two applications for monitoring the status of the same link to a remote node.

FIG. 1 is a network diagram illustrating exemplary network architecture for optimizing multiple BFD sessions. Referring to FIG. 1, a computing platform 100 includes applications 102 and 104 that need to monitor the status of connectivity to a remote node 106. Rather than establishing separate BFD sessions that exchange BFD control packets over the link being monitored for each application 102 and 104, computing platform 100 establishes a master BFD session 108 that sends and receives BFD control packets 110 over network interface or link 112 being monitored and a slave session 114 that obtains BFD session status from master BFD session 108.

More particularly, application 102 establishes a first BFD session that monitors the status of bidirectional connectivity to remote node 106 over network interface 112 by exchanging BFD control packets with remote node 106 over network interface 112. When application 104 located on computing platform 100 needs to establish its BFD session, rather than establishing a session that results in sending additional BFD control packets to and receiving additional BFD control packets from remote node 106, computing platform 100 establishes slave BFD session 114 that obtains BFD session status information from master BFD session 108. When master BFD session 108 determines the state of network interface 112 based on the receipt or non-receipt of BFD control packets, slave BFD session 114 updates its BFD session state information correspondingly. Additional detail regarding the establishment of master and slave BFD sessions will now be described.

Figure 2A:
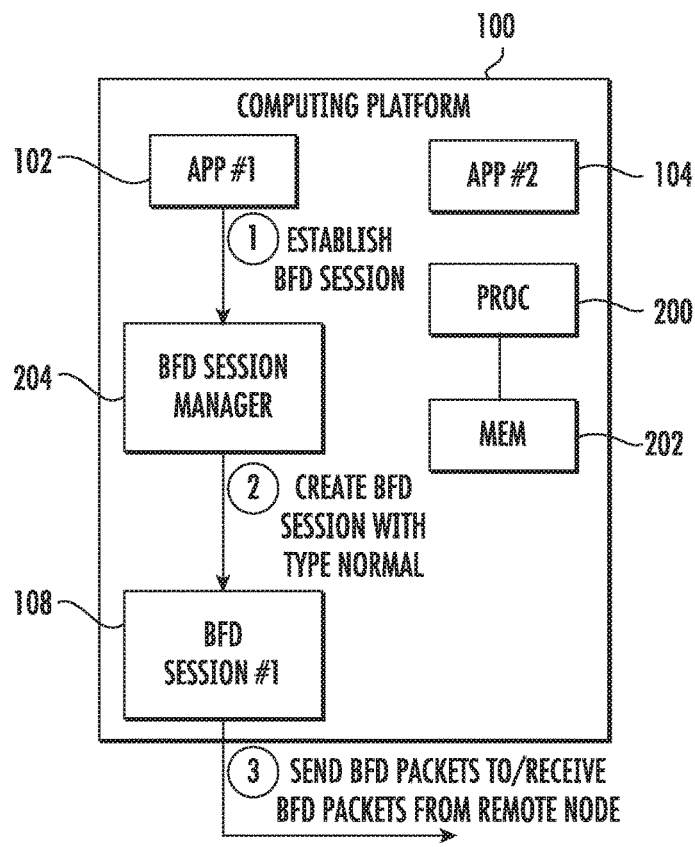
FIG. 2A is a block diagram of a computing platform illustrating exemplary steps performed by the computing platform for establishing an initial BFD session for monitoring the status of a link to a remote node.

FIG. 2A illustrates exemplary steps performed by computing platform 100 the first time a BFD session is established. Referring to FIG. 2A, computing platform 100 includes applications 102 and 104 illustrated in FIG. 1 that need BFD sessions. However, at the time in FIG. 2A, the BFD sessions have not been established. Computing platform 100 includes a processor 200 and a memory 202. Applications 102 and 104 and any other applications may reside in memory 202 and execute on processor 200. In the illustrated example, computing platform 100 includes a BFD session manager 204 that controls the establishment of BFD sessions and the linking of BFD sessions.

Referring to the message flow illustrated in FIG. 2A, application 102 sends a request to BFD session manager 204 to establish a BFD session. The request specifies the network interface or link being monitored for liveness. In this example, it is assumed that the network interface is network interface 112 illustrated in FIG. 1 that connects computing platform 100 to remote node 106. In response to receiving the request, BFD session manager 204 first checks to see whether there are any existing BFD sessions assigned to monitor the status of network interface 112. In this example, it is assumed that no existing BFD sessions for monitoring the status of network interfaced 112 have been established. Accordingly, in step 2, BFD session manager 204 creates a BFD session instance 108 and sets the type of BFD session to normal. BFD session instance 108 sets BFD session timers and sends BFD control packets to and receives BFD control packets from remote node 106. Initially, the BFD control packets are used to establish the BFD session with remote node 106, BFD session establishment will be described below. Once the BFD session is established, the BFD control packets are exchanged to monitor the state of network interface 112. BFD session 108 may communicate BFD session state information to application 102. The BFD session state information may indicate whether the BFD session is initializing, up, or down. If the BFD session state indications that the BFD session is up, then application 102 may determine that connectivity with remote node 106 is up or available. If the BFD session state information indicates that the BFD session is down, application 102 may determine that connectivity with remote node 106 is down or unavailable.

In one exemplary implementation, BFD session instance 108 may operate in a primary mode, which is referred to as asynchronous mode. In this mode, BFD session instances on computing platform 100 and remote node 106 periodically send BFD control packets to each other. Timers are maintained by the BFD session instance of each end of a BFD session. One timer that is maintained is referred to as a BFD session time that indicates the maximum time that the BFD session instance at each end of the link expects to pass without receiving a BFD control packet from the BFD session instance at the remote end of the link. If a BFD control packet is not received by a BFD session instance before its respective BFD detection timer expires, the interpreted by each end to indicate that the link is down. Receipt of a BFD control packet before the BFD detection timer expires causes the BFD session timer to be reset, and the status of the link remains up (if currently up). In primary mode, the BFD session instances periodically exchange BFD control packets to monitor link status.

In another example, the BFD sessions between computing platform 100 and remote node 106 may operate in a demand mode. In demand mode, it is assumed that each system has an independent way of verifying that it has connectivity to another system. Once a BFD session is established, the BFD session instance at one end of a link may ask the BFD session instance at the other end of the link to stop sending BFD control packets, except when the first BFD session instance needs to verify connectivity explicitly, in which case a short sequence of BFD control packets is exchanged and the remote system operates similarly. Demand mode may operate independently in each direction or simultaneously. BFD session manager 204 may configure BFD session 108 to operate in primary mode, demand mode, or any other mode that involves sending BFD control packets to and receiving BFD control packets from a remote node to obtain BFD session state.

Figure 2B:
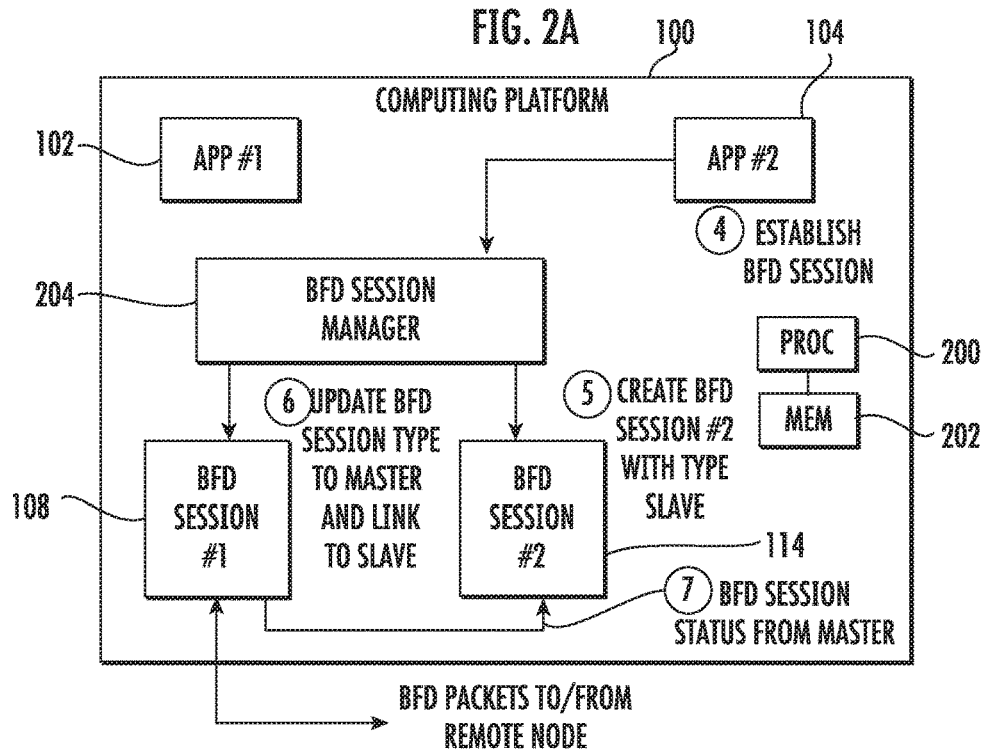
FIG. 2B is a block diagram of a computing platform illustrating exemplary steps performed by the computing platform to establish a second BFD session after establishing a first session for monitoring the status of a link to a remote node.

FIG. 2B illustrates operations performed by a computing platform 100 when a second application seeks to establish a BFD session for monitoring the status of a link to the remote node when a BFD session has already been established to monitor the status of the same link. Referring to FIG. 2B, application 104 sends a request to BFD session manager 204 to request establishment of a BFD session to monitor the status of network interface 112 to remote node 106 illustrated in FIG. 1. BFD session manager 204, in response to the request, determines that a BFD session is already established to monitor the status of network interface 112. Accordingly, BFD session manager 204 creates a BFD session 114 and sets the type of BFD session 114 to slave. BFD session manager 204 also updates the status of BFD session 108 from normal to master and links BFD session 108 with BFD session 114. To link the two BFD sessions, BFD session manager 204 may update master BFD session 108 to contain a local discriminator ID of the slave BFD session as a linked discriminator ID. BFD session manager 204 may also update slave BFD session 114 to store the local discriminator ID of master BFD session 108 under a linked local discriminator ID parameter.

As used herein, the term "discriminator ID" is a value used to identify BFD sessions. A linked discriminator ID is a parameter used by a BFD session to identify BFD sessions with which the BFD session is linked. If a master BFD session is linked to one or more slave BFD session, the master BFD session may store, as linked discriminator IDs, the discriminator IDs of all of the slave BFD sessions with which the master is linked. Similarly, a slave BFD session may store, as linked discriminator ID, the discriminator ID of the master BFD session with which the slave BFD session is linked.

Master BFD session 108 continues to send BFD control packets to and receive BFD control packets from remote node 106. Slave BFD session 114 obtains its BFD session status from master BFD session 108 without sending BFD control packets to or receiving BFD control packets from remote node 106. In one implementation, slave BFD session 114 may check the status of master BFD session 108 with every time out of the transmit timer of the slave BFD session and update the status with the status that the slave BFD session obtains from the master BFD session at each transmit timeout. Slave BFD session 114 may not run a BFD detection timer, as slave BFD session is not expecting to receive any packets. Instead, slave BFD session 114 obtains BFD session state from master BFD session 108 and updates the BFD session state maintained by slave BFD session 114.

Figure 2C:
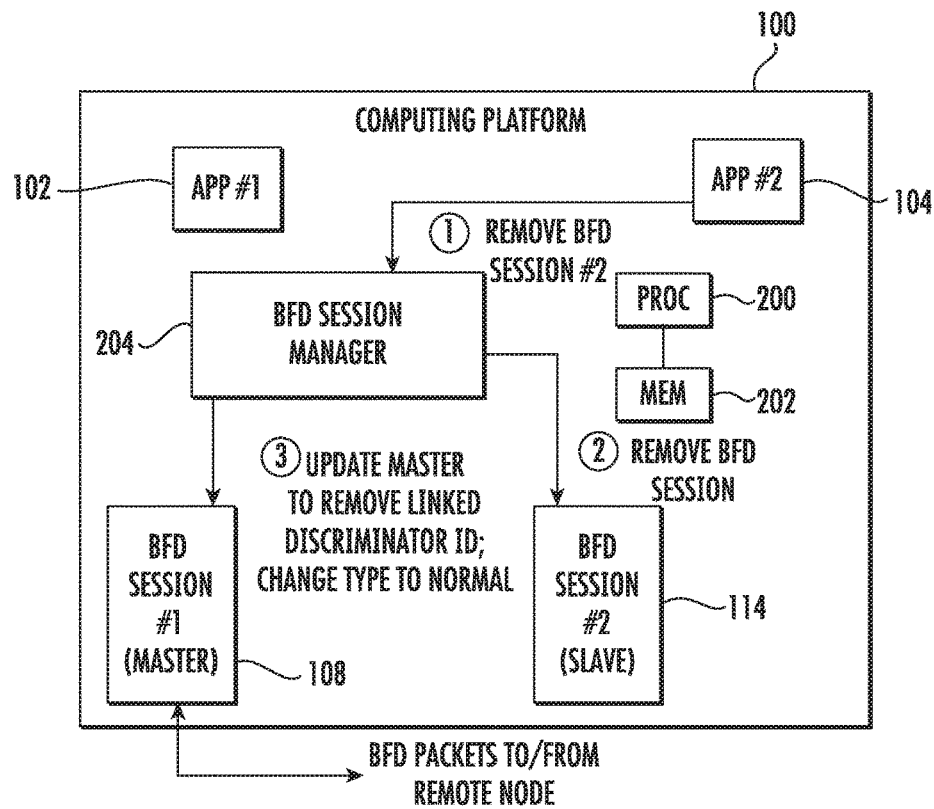
FIG. 2C is a block diagram of a computing platform illustrating exemplary steps performed by the computing platform for removing a slave BFD session when it is no longer needed by its respective application.

FIG. 2C illustrates exemplary operations that may be performed by computing platform 100 when the slave BFD session is removed. Referring to FIG. 2C, BFD session manager 204 receives a request from application 104 to remove slave BFD session 114. In response, BFD session manager 204 removes or reallocates resources for slave BFD session 114. BFD session manager 204 also updates master BFD session 108 to remove the linked discriminator ID of BFD session 114 from the list of linked discriminator IDs maintained by master BFD session 108. If there are no linked discriminator IDs, BFD session manager 204 may change the type of BFD session 108 from master to normal. If one or more linked discriminator IDs remain, the type of master BFD session 108 is not changed.

Figure 2D:
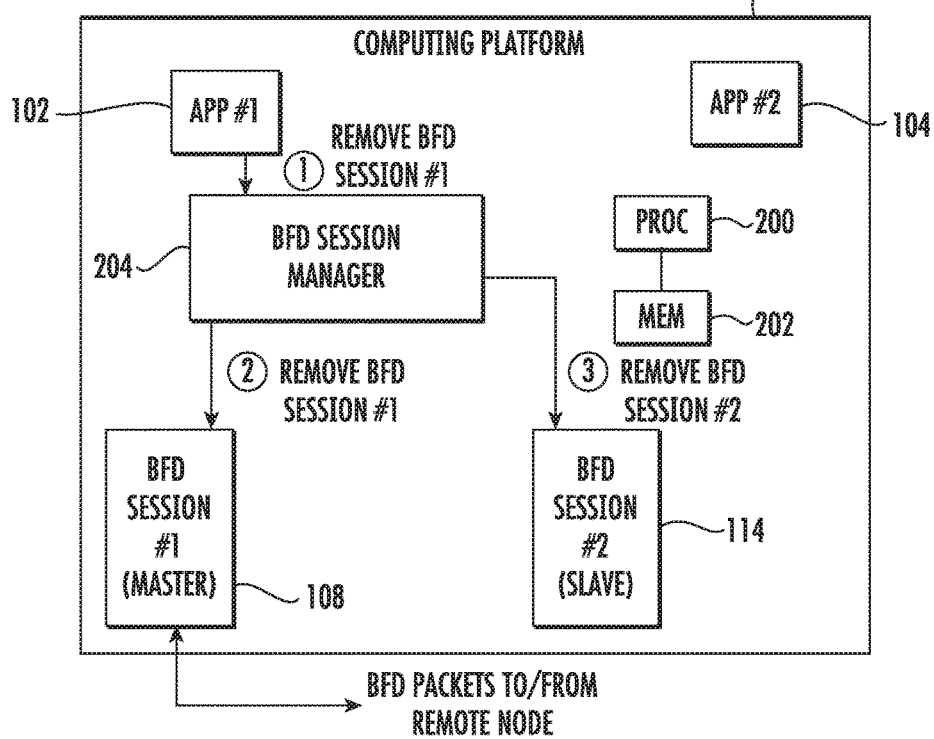
FIG. 2D is a block diagram of a computing platform illustrating exemplary steps performed by the computing platform for removing a master BFD session and associated slave sessions.

FIG. 2D illustrates operations performed by computing platform 100 when a master BFD session is removed. Referring to FIG. 2D, application 102 sends a message to BFD session manager 204 to remove BFD session 108, which is currently functioning as a master BFD session. In response, BFD session manager 204 removes master BFD session 108 reallocates corresponding resources. BFD session manager 204 also removes any slave sessions currently linked to master session 108. In the illustrated example, BFD session manager 204 removes slave BFD session 114.

In order to support linked BFD sessions where one session functions as the master and one or more sessions function as slave sessions as described herein, new data may be added to the data normally exchanged as part of the BFD protocols specified in RFC 5880. Table 1 shown below illustrates a BFD control packet format specified in RFC 5880.

TABLE 1

BFD Control Packet Format

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Vers | | | Diag | | | | | Sta | | P | F | C | A | D | M | Detect Mult | | | | | | | | Length | | | | | | | |
| My Discriminator | | | | | | | | | | | | | | | | | | | | | | | | | | | | | | | |
| Your Discriminator | | | | | | | | | | | | | | | | | | | | | | | | | | | | | | | |
| Desired Min TX Interval | | | | | | | | | | | | | | | | | | | | | | | | | | | | | | | |
| Recuired Min RX Interval | | | | | | | | | | | | | | | | | | | | | | | | | | | | | | | |
| Required Min Echo DX Interval | | | | | | | | | | | | | | | | | | | | | | | | | | | | | | | |

In Table 1, the BFD control packet format includes various fields that support BFD protocol operations. The version field specifies the version number of the BFD protocol. The diagnostic field contains a diagnostic code specifying the local system's reason for the last change in session state values are:

0—No diagnostic
   1—Controlled detection time expired
   2—Echo function failed
   3—Neighbor signaled session down
   4—Forwarding plane reset
   5—Path down
   6—Concatenated path down
   7—Administratively down 8—reverse concatenated path down
9-31—Reserved for future use The diagnostic field allows remote systems to determine the reason that the previous session failed. The STA field in the BFD control packet specifies the current BFD session state as seen by the transmitting system. Values are:

0—Admin down
1—Down
2—Init
3—Up

The Poll field, if set, is used by the transmitting system to request verification of connectivity or of a parameter change. The Poll field indicates that the transmitting system is expecting a packet with a Final bit (F) in the reply. If clear, the transmitting system is not requesting verification.

The Final field (F), if set, indicates that the transmitting system is responding to a received BFD control field that contains the Poll bit (P) set. If clear, the transmitting system is not requesting a Poll.

Control Plane Independent (C)

If set, the transmitting system's BFD implementation does not share fate with its control plane (in other words, BFD is implemented in the forwarding plane and can continue to function through disruptions in the control plane). If clear, the transmitting system's BFD implementation shares fate with its control plane.

Authentication Present (A)

If set, the Authentication Section is present and the session is to be authenticated. BFD session authentication may be used for security purposes to ensure that BFD sessions are authorized to operate in a given network.

Demand (D)

If set, Demand mode is active in the transmitting system (the system wishes to operate in Demand mode, knows that the session is Up in both directions, and is directing the remote system to cease the periodic transmission of BFD control packets). If clear, Demand mode is not active in the transmitting system.

Multipoint (M)

This bit is reserved for future point-to-multipoint extensions to BFD. It MUST be zero on both transmit and receipt.

Detect Mult

Detection time multiplier. The negotiated transmit interval, multiplied by this value, provides the detection time for the receiving system in asynchronous mode. As stated above, a BFD session endpoint may utilize the detection time to detect non-receipt of a BFD packet and change the status of a BFD session to down.

Length

Length of the BFD Control packet, in bytes.

My Discriminator

A unique, nonzero discriminator value generated by the transmitting system, used to demultiplex multiple BFD sessions between the same pair of systems.

Your Discriminator

The discriminator received from the corresponding remote system. this field reflects back the received value of My Discriminator, or is zero if that value is unknown.

Desired Min TX Interval

This is the minimum interval, in microseconds, that the local system would like to use when transmitting BFD Control packets, less any jitter applied. The value zero is reserved.

Required Min RX Interval

This is the minimum interval, in microseconds, between received BFD Control packets that this system is capable of supporting, less any jitter applied by the sender. If this value is zero, the transmitting system does not want the remote system to send any periodic BFD Control packets.

Required Min Echo RX Interval

This is the minimum interval, in microseconds, between received BFD Echo packets that this system is capable of supporting, less any jitter applied by the sender. If this value is zero, the transmitting system does not support the receipt of BFD Echo packets.

As can be seen from Table 1, the BFD control packet format includes discriminator ID that identifies the local endpoint of each session. One new parameter not specified in RFC 5880 that is needed is BFD session type. The types that may be needed according to the subject matter described herein are normal, master, and slave. A BFD session type of normal indicates that the BFD session is a standard session and would behave as per RFC 5880 and/or 7880. RFC 7880 updates RFC 5880 but does not contain the session types of master, slave, and normal. The session type of master indicates that the BFD session would have the following additional functionality in addition to the IETF RFC 5880/7880 functionality:

1. The session would contain a list of linked discriminator ID to identify one or more slave BFD sessions attached to the master BFD session
2. The master BFD session would let the slave BFD session obtain state information from the master BFD session and allow the slave BFD session to decide its own state.
3. When the master BFD session is removed, associated slave linked BFD sessions would also be removed.
4. Multiple slave BFD sessions can be associated with the same master BFD session.

The BFD session type of slave would have the following addition functionality not specified in RFC 5880/7880:

1. The slave BFD session would contain a linked discriminator ID to identify its master BFD session.
2. The slave BFD session would not send or receive any BFD control packets.
3. The slave BFD session would update its state or status based on the status of the master BFD session.
4. The slave BFD session can be removed or deleted irrespective of the status of the corresponding master BFD session.
5. The slave BFD session would not run a control detection timer and would feed on master BFD session's state.
6. The slave BFD session, upon expiration of a transmit timer, would check the state of the master BFD session and update the state of the slave BFD session based on the state of the master BFD session with which the slave BFD session is linked.

In addition to the new BFD session type parameters of normal, master, and slave, another new parameter that is needed and that is not presently in the BFD protocol as specified in RFCs 5880 and 7880 is a linked discriminator ID. The linked discriminator ID is the discriminator ID of the BFD session associated with or linked to the BFD session in question. A master BFD session may contain a list of local discriminator IDs of all slave BFD sessions that are linked to the master BFD session. A slave BFD session would contain, as the linked discriminator ID, the local discriminator ID of the master BFD session to which the slave BFD session is linked.

A variety of options may be used to include the additional parameters in the BFD protocol. In one option, the BFD control packet format illustrated in Table 1 can be modified to support the additional parameters of the session types and linked discriminator ID. BFD control packets including the new parameters can be exchanged as part of BFD session establishment to communicate the session type and any linked discriminator IDs.

Figure 3:
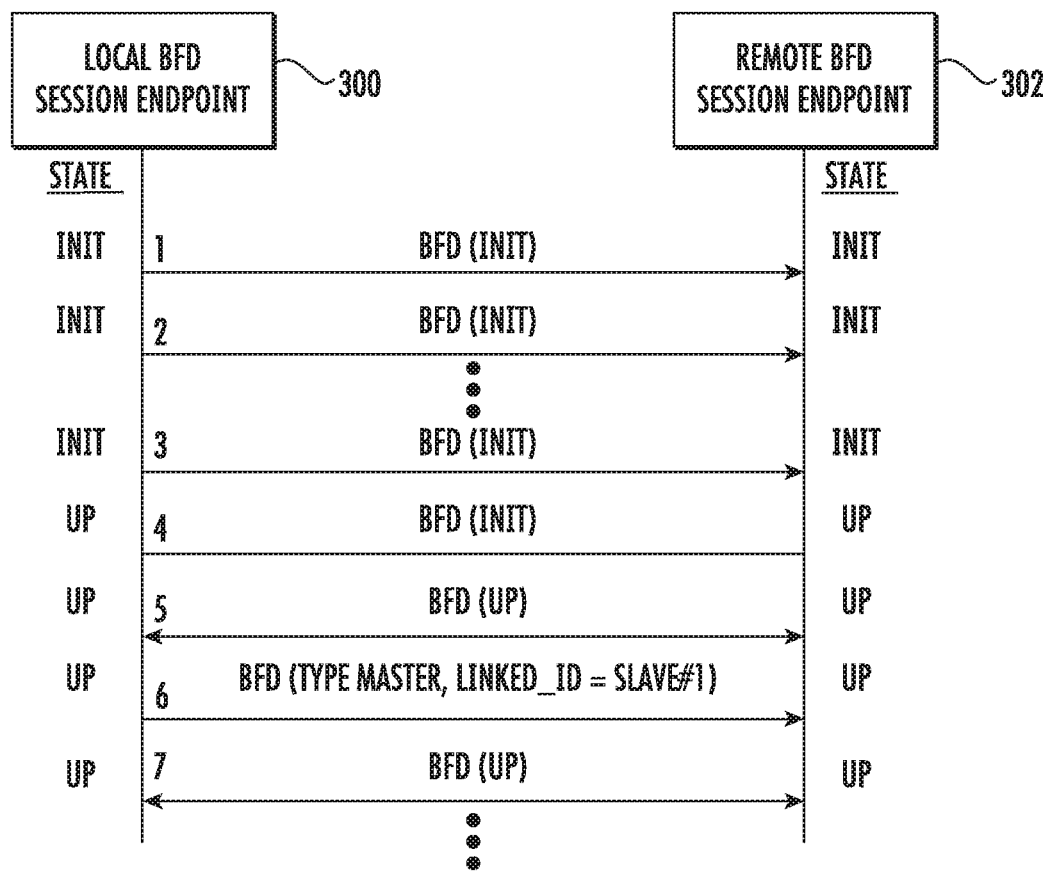
FIG. 3 is a message flow diagram illustrating BFD session establishment and exchange of BFD session type information between local and remote BFD session endpoints.

FIG. 3 is a message flow diagram illustrating exemplary BFD session establishment and the use of a BFD control packet to communicate BFD session type information between BFD session endpoints. Referring to FIG. 3, a local BFD session instance on endpoint 300 seeks to establish a BFD session with remote BFD session instance endpoint 302. The establishment of BFD session is achieved by exchanging BFD control packets. Referring to FIG. 3, in lines 1-3, local BFD session 300 begins sending BFD control packets indicating a state of INIT or initial to BFD session endpoint 302. The BFD packets include the session BFD discriminator ID of BFD session endpoint 300. Once BFD session endpoint 302 sends a packet back to local BFD session endpoint 300 with the local BFD session discriminator ID of BFD session endpoint 302 and mirroring the BFD session discriminator ID of BFD session endpoint 300, the status of both BFD session endpoints 300 and 302 changes to up, as indicated in line 4 of the message flow diagram. In line 5, once the BFD session is up, BFD control packets are periodically sent by each session endpoint 300 and 302 and used to maintain BFD session status.

Because only a single BFD session exists between endpoints 300 and 302, each BFD session endpoint may set the type of the BFD session to normal. In the illustrated example, it is assumed that an application located on the same computing platform as local BFD session endpoint 300 requests establishment of a new BFD session for monitoring the status of the same link as the initial BFD session. Because a BFD session is already established to monitor the status of the link, the type of the new BFD session will be set to slave. Accordingly, in line 6 of the message flow diagram, local BFD session endpoint 300 sends a BFD control packet indicating that the initial BFD session type should be changed from normal to master and also containing the local discriminator ID of the slave BFD session to be linked to the master BFD session. In response to receiving the BFD control packet, remote BFD session endpoint 302 may establish a new slave BFD session with the slave BFD session ID as its linked BFD discriminator ID. Local BFD session endpoint 300 may establish its half or local instance of a local slave BFD session linked to the corresponding master BFD session. Once the initial BFD session is changed to master by both endpoints and the local slave BFD session instances are established, the BFD control packets exchanged between the master BFD session instances, as indicated by line 7 in the message flow diagram, are used to update the status of the slave BFD session instances. If the master BFD session instance changes its state to down, the slave BFD session instance changes its state to down. Similarly, if the master BFD session instance indicates that the BFD session is up, the slave BFD session instance reads this state information and indicates that the slave BFD session is up. The local slave BFD session instances do not exchange BFD control packets but instead obtain their state information from their corresponding master BFD session instances.

In an alternate implementation, another option for exchanging the BFD session type information of master, normal, and slave between BFD session endpoints is to use reserved values of the diagnostic code illustrated in Table 1 to communicate the session type to the remote node. The linked discriminator ID may be used for session management at the local node and not communicated to the remote node. The message flow for such an implementation would be the same as that illustrated in FIG. 3 except that the linked discriminator ID is not communicated to the other endpoint. Instead, in line 6 of the message flow, the BFD control message includes a message type of master without specifying the linked discriminator ID. Each of endpoints 300 and 302 may maintain their own linked discriminator IDs for the associated slave session instances.

In yet another alternate implementation, session type and linked discriminator IDs may be maintained locally at each node without conveying the information to the remote nodes. The message flow for such an option would be similar to that illustrated in FIG. 3 except that the communication in line 6 to change the session type of the initial BFD to master would not be needed. Each BFD session endpoint would instead change the type of its local BFD session instance to master when an application requests establishment of a new BFD session to monitor the same link as the master.

Figure 4:
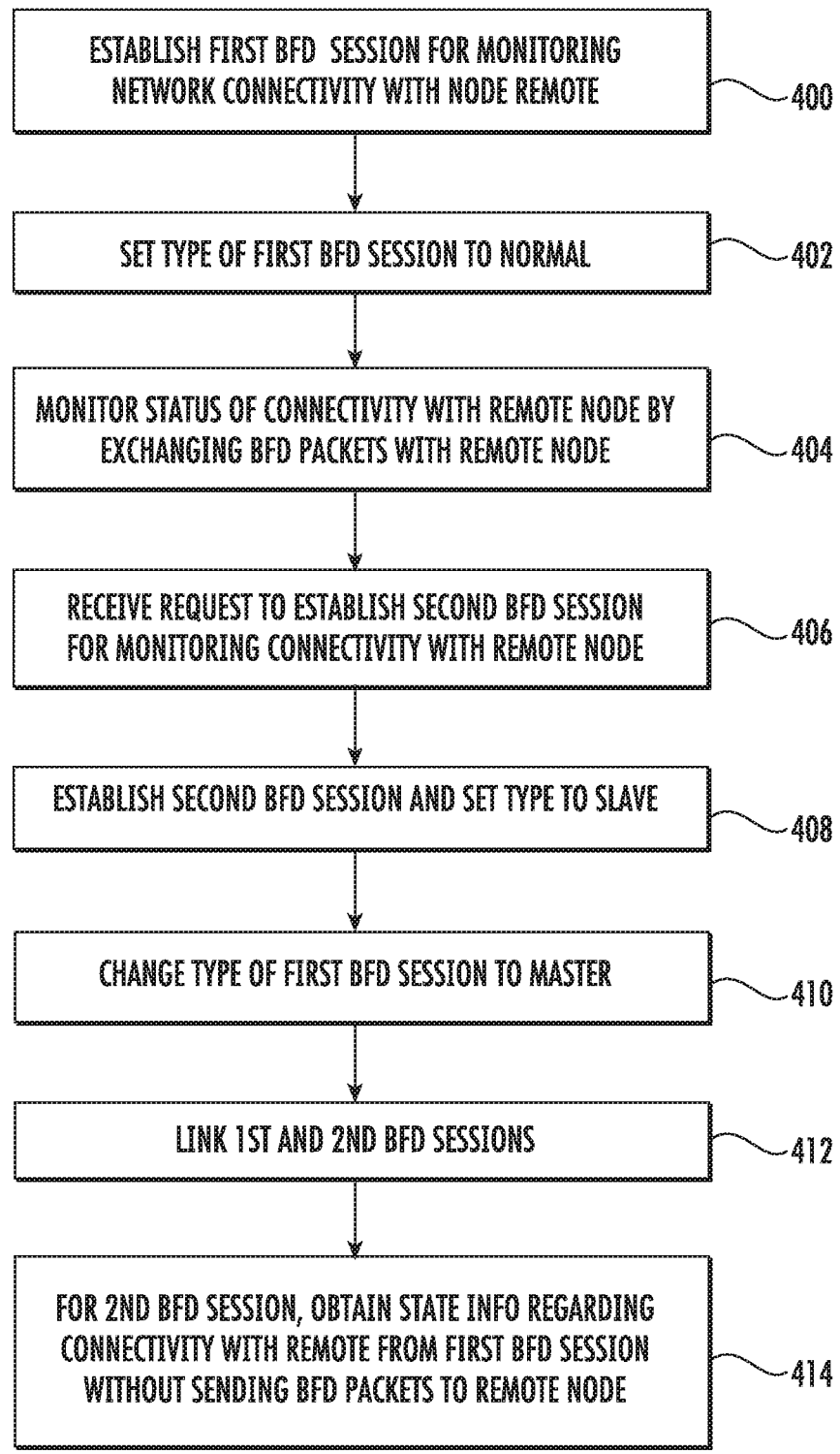
FIG. 4 is a flow chart illustrating an exemplary process for establishing master and slave BFD sessions for monitoring connectivity with a remote node.

FIG. 4 is a flow chart illustrating an exemplary process for multiple BFD session optimization. Referring to FIG. 4, in step 400, a first BFD session is established for monitoring connectivity with a remote node. The first BFD session may be established using messaging similarly to that in FIG. 3. The establishment of the BFD session may be controlled by a BFD session manager, such as BFD session manager 204, that resides at each endpoint to the session.

In step 402, the type of the BFD session is set to normal. For example, BFD session manager 204 at each endpoint may determine that this is the first BFD session to monitor the status of the link with a remote node and consequently may set the type of the first BFD session to normal.

In step 404, status of connectivity to the remote node is monitored by exchanging BFD control packets with the remote node. For example, each BFD session instance may send BFD control packets to its corresponding BFD session instance at the other end of the connection or link being monitored. Each BFD session instance may set timers. If BFD control packets are not received from the BFD session instance at the other end of the link before the timer expires, each BFD session instance may set the status of BFD session to down, which the corresponding application interprets to mean that the link over which the BFD packets are exchanged is down. If the BFD control packets are received without interruption, each BFD session instance may set the status of the BFD session to up, and the corresponding application may interpret the status of BFD session to mean that the link is up.

In step 406, a request is received to establish a second BFD session for monitoring connectivity to the remote node. This is the same remote node identified in step 400. The request may be generated by an application that needs to monitor the status of the same link. The application can be any suitable application, such as a routing application, or an application that uses routing services. The request may be received by BFD session manager 204.

In step 408, a second BFD session is established, and the type of the second BFD session is set to slave. For example, BFD session manager 204 may set the type of the newly established BFD session to slave. This action may be performed by the BFD session managers at each endpoint of the BFD session.

In step 410, the type of the first BFD session is changed to master. For example, the BFD session manager at each endpoint may change the type of the first BFD session instance from normal to master.

In step 412, the first and second BFD sessions are linked. For example, the BFD session manager at each BFD session endpoint may update the master session to contain the local discriminator ID at the corresponding slave session. The BFD session manager 204 at each endpoint may also update the linked discriminator ID of the slave session instance at each endpoint to contain the local discriminator ID of the master session.

In step 414, the state information for the second BFD session, i.e., the slave session, is obtained from the master BFD session without sending BFD packets for the slave BFD session to the remote node. For example, each slave BFD session instance at each endpoint may obtain state information for the BFD session from its respective master BFD session instance.

The steps illustrated in FIG. 4 may be performed for any number of slave BFD sessions. That is, more than one slave BFD session may be linked to a corresponding master BFD session and all of the BFD sessions linked to a master BFD session may obtain state information for the respective applications from the corresponding master BFD session without sending BFD control packets for the slave BFD sessions to the remote endpoint. As a result, processing and network traffic may be reduced over conventional BFD implementations that require each BFD session instance to exchange BFD control packets with the remote endpoint.

Figure 5:
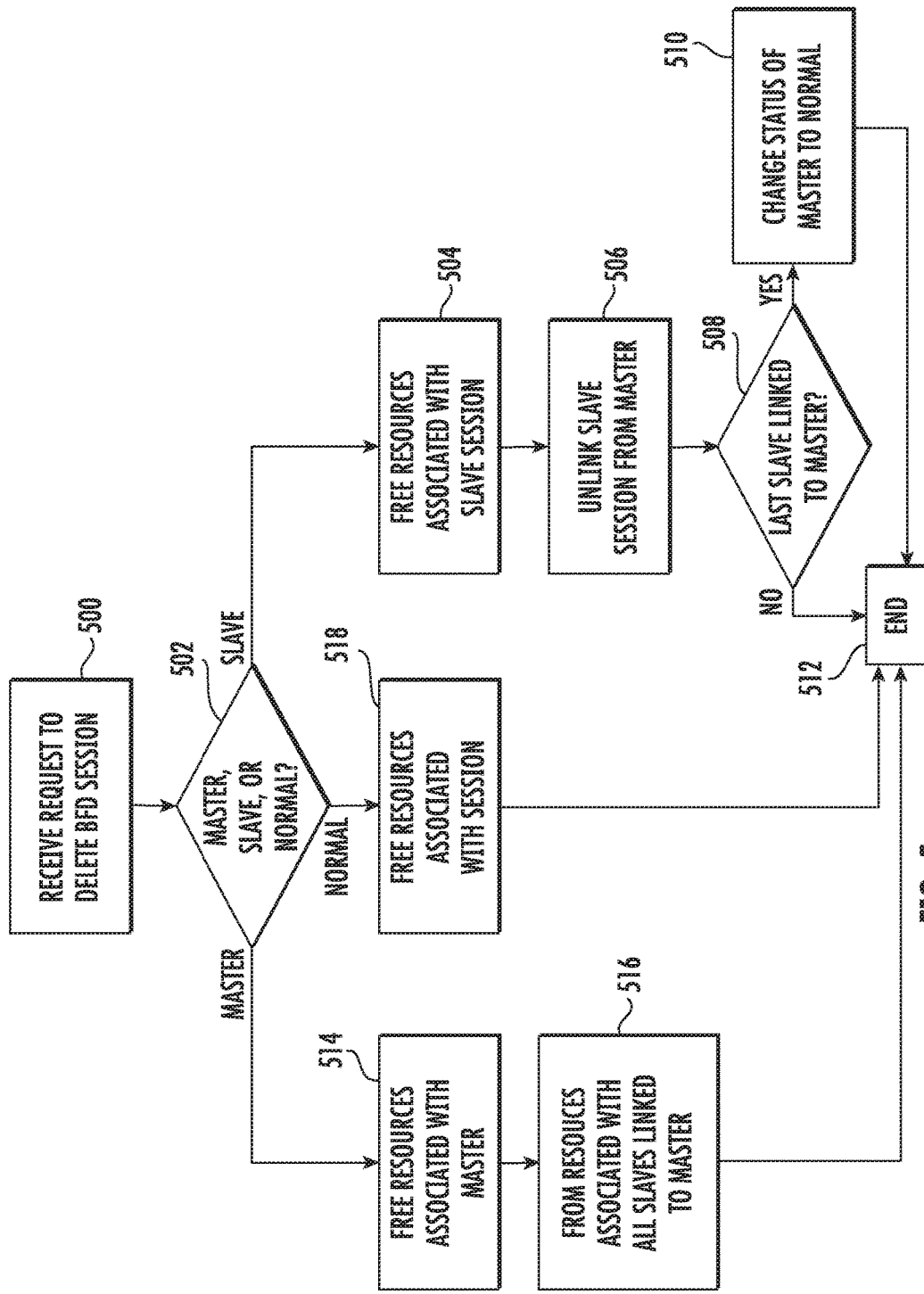
FIG. 5 is a flow chart illustrating an exemplary process for removing master, slave, and normal BFD sessions.

FIG. 5 is a flow chart illustrating an exemplary process for removing BFD sessions when the BFD sessions can include different session types. Referring to FIG. 5, in step 500, a request to delete a BFD session is received. The request may be generated by an application and sent to a corresponding BFD session manager indicating that the application no longer requires the services of a BFD session.

In step 502, it is determined whether the type of the session for which removal is requested is master, slave, or normal. This determination may be made by BFD session manager 204. If the type of the BFD session for which removal is requested is determined to be slave, control proceeds to step 504 where resources associated with the slave session are removed. For example, each BFD session manager at each endpoint may free memory and processing resources associated with the slave BFD session.

In step 506, a slave BFD session is unlinked from the master BFD session. For example, BFD session manager 204 may remove the slave discriminator ID from the linked discriminator ID list of the corresponding master BFD session.

In step 508, it is determined whether the slave session that was removed is the last slave session linked to the master. This determination may be made by BFD session manager 204. If the slave is determined to be the last slave linked to the master, control proceeds to step 510 where the status of the master is changed to normal. For example, BFD session manager 204, in response to determining that the linked discriminator ID list for a master is empty, may change the status of the master BFD session to normal. As stated above, normal means operating with accordance with RFC 5880 by exchanging BFD control packets with a remote endpoint. In step 512, the removal process ends.

Returning to step 502, if the status of the session for which removal is requested is determined to be master, control proceeds to step 514 where resources associated with the master BFD session are freed. Freeing resources may include freeing memory and processing resources used by the master BFD session. Because the master BFD session is being removed, all of the associated slave BFD sessions may also be removed. Accordingly, in step 516, resources associated with the linked slave sessions are removed. Control then proceeds to step 512 where the removal process ends.

Because a master session may be removed in response to a request from its application, and linked slave BFD sessions may also be removed, the applications whose slave BFD sessions are removed may reestablish their BFD sessions. The first BFD session reestablished to monitor the status of a given link may be the new master BFD session. Any subsequently established BFD sessions to monitor the link may be established as slave BFD sessions linked to the new master BFD session.

Returning again to step 502, if the status of the session for which removal is requested is determined to be normal, control proceeds to step 518 where the resources associated with the normal session are removed. In step 512, the removal process ends.

REFERENCES

The following references provide further details of the BFD protocol that may be implemented and extended by BFD session manager 204. The disclosure of each of the following references is incorporated herein by reference in its entirety.
1. IETF RFC 5880, Bidirectional Forwarding Detection (BFD), June 2010.
2. IETF RFC 7880, Seamless Bidirectional Forwarding Detection (S-BFD), July 2016.
3. IETF RFC 7419, Common Interval Support in Bidirectional Forwarding Detection, December 2014.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for optimizing multiple bidirectional forwarding detection (BFD) sessions, the method comprising
at a computing platform, receiving a request for establishing a BFD session and in response, establishing a first BFD session for monitoring connectivity with a remote node over a network interface;
setting a type of the first BFD session to normal;
exchanging BFD control packets with the remote node as part of the first BFD session for monitoring connectivity with the remote node;
receiving a request for establishing a second BFD session for monitoring connectivity with the remote node over the network interface and, in response, changing the type of the first BFD session to master;
creating a second BFD session and setting a type of the second BFD session to slave; and
for the second BFD session, obtaining BFD session state from the first BFD session without exchanging BFD control packets for the second BFD session with the remote node.

2. The method of claim 1 comprising linking the first and second BFD sessions.

3. The method of claim 2 wherein linking the first and second BFD sessions includes updating the first BFD session to store a BFD discriminator ID of the second BFD session as a linked discriminator ID.

4. The method of claim 3 wherein linking the first and second BFD sessions includes updating the second BFD session to store a discriminator ID of the first BFD session as a linked discriminator ID.

5. The method of claim 1 comprising receiving a request to remove the first BFD session and, in response, removing the first BFD session and any slave BFD sessions linked to the first BFD session.

6. The method of claim 1 comprising linking multiple slave BFD sessions to the first BFD session.

7. The method of claim 1 comprising communicating BFD session type information to the remote node using a modification to BFD protocol messaging to support BFD session type as a BFD control packet parameter.

8. The method of claim 1 comprising communicating BFD session type information to the remote node using a reserved field in a BFD control packet.

9. The method of claim 1 comprising maintaining BFD session type information locally at the computing platform without transmitting the BFD session type information to the remote node.

10. A system for optimizing multiple bidirectional forwarding detection (BFD) sessions, the system comprising:
 a computing platform including at least one processor;
 a BFD session manager implemented by the at least one processor for receiving a request for establishing a BFD session and, in response, establishing a first BFD session for monitoring connectivity with a remote node over a network interface, setting a type of the first BFD session to normal, receiving a request for establishing a second BFD session for monitoring connectivity with the remote node over the network interface, changing the type of the first BFD session to master, creating a second BFD session, and setting a type of the second BFD session to slave;
 wherein the first BFD session exchanges BFD control packets with the remote node as part of the first BFD session for monitoring connectivity with the remote node; and
 wherein the second BFD session obtains BFD session state information from the first BFD session without exchanging BFD control packets for the second BFD session with the remote node.

11. The system of claim 10 wherein the BFD session manager links the first and second BFD sessions.

12. The system of claim 11 wherein the BFD session manager links the first and second BFD sessions by updating the first BFD session to store a BFD discriminator ID of the second BFD session as a linked discriminator ID.

13. The system of claim 12 wherein the BFD session manager links the first and second BFD sessions by updating the second BFD session to store a discriminator ID of the first BFD session as a linked discriminator ID.

14. The system of claim 10 wherein the BFD session manager receives a request to remove the first BFD session and, in response, removes the first BFD session and any slave BFD sessions linked to the first BFD session.

15. The system of claim 10 wherein the BFD session manager links multiple slave BFD sessions to the first BFD session.

16. The system of claim 10 wherein the BFD session manager communicates BFD session type information to the remote node.

17. The system of claim 16 wherein the BFD session manager communicates the BFD session type information to the remote node using a modification to BFD protocol messaging to support BFD session type as a BFD control packet parameter.

18. The system of claim 16 wherein the BFD session manager communicates the BFD session type information to the remote node using a reserved field in a BFD control packet.

19. The system of claim 10 wherein the BFD session manager maintains BFD session type information locally at the computing platform without transmitting the BFD session type information to the remote node.

20. A non-transitory computer readable medium having stored thereon executable instructions that when executed by a processor of a computer control the computer to perform steps comprising:
 at a computing platform, receiving a request for establishing a BFD session and in response, establishing a first BFD session for monitoring connectivity with a remote node over a network interface;
 setting a type of the first BFD session to normal;
 exchanging BFD control packets with the remote node as part of the first BFD session for monitoring connectivity with the remote node;
 receiving a request for establishing a second BFD session for monitoring connectivity with the remote node over the network interface and, in response, changing the type of the first BFD session to master;
 creating a second BFD session and setting a type of the second BFD session to slave; and
 for the second BFD session, obtaining BFD session state from the first BFD session without exchanging BFD control packets for the second BFD session with the remote node.

* * * * *